United States Patent Office 3,346,594
Patented Oct. 10, 1967

3,346,594
HALOALKYL AND POLYHALOALKYL LACTONES
Ashot Merijan, Rahway, and Frederick Grosser, Midland Park, N.J., assignors to General Aniline & Film Corporation, New York, N.Y., a corporation of Delaware
No Drawing. Filed Aug. 25, 1965, Ser. No. 482,635
8 Claims. (Cl. 260—343)

ABSTRACT OF THE DISCLOSURE

A new class of 5-, 6- and 7-membered lactones, containing a monohaloalkyl or polyhaloalkyl group on the carbon atom alpha to the carbonyl of the lactone ring, is provided which has many new and useful applications in the chemical arts.

---

This invention relates to a new, novel and useful class of haloalkyl and polyhaloalkyl lactones and to the process of preparing the same.

We have discovered that 5-, 6-, and 7-membered lactones are readily haloalkylated or polyhaloalkylated with a halo-α-olefin or polyhalo-α-olefin in the absence of an organic peroxide to yield a large variety of new and useful products which may be employed as such or in organic synthesis to yield still another class of new and useful products.

Accordingly, the principal object of the present invention is to provide a new, novel and useful class of haloalkyl and polyhaloalkyl 5-, 6-, and 7-membered lactones and to the process of preparing the same.

Other objects and advantages will become apparent from the following description.

The foregoing objects are attained by the free-radical addition of a halo-α-olefin or a polyhalo-α-olefin to a 5-, 6-, or 7-membered lactone under pressure at a temperature of from 110° to 180° C. for a period of time ranging from 5 to 24 hours. In conducting the haloalkylation or polyhaloalkylation reaction, it is preferred that the molar ratio of the lactone to the halo-α-olefin or polyhalo-α-olefin and the organic peroxide be in the range of 5–20:1:0.1–0.25. The lactone and the organic peroxide, which serves as the catalyst, i.e., the initiator of the free radical addition, are added into a stainless steel rocker bomb. The halo-α-olefin or the polyhalo-α-olefin is then charged to the bomb and the bomb heated and maintained at a temperature of from 110° to 180° C. for a period of time ranging from 5 to 24 hours. The pressure developed in the bomb may range from 50–1000 p.s.i.g. After cooling to room temperature, the contents of the bomb are discharged into any suitable vacuum distillation flask to remove the excess lactone and the decomposition products. The haloalkyl or polyhaloalkyl lactone is obtained by vacuum distillation of the residue.

The haloalkylated or polyhaloalkylated lactones obtained in accordance with the present invention are characterized by the following formula:

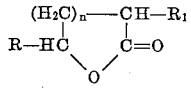

wherein $n$ is an integer of from 1 to 3, R is either hydrogen or alkyl of from 1 to 4 carbon atoms, e.g. methyl, ethyl, propyl, isopropyl and butyl, and $R_1$ is either haloalkyl or polyhaloalkyl of from 2 to 6 carbon atoms.

As examples of halo-α-olefins and polyhalo-α-olefins which by the free radical addition are added in the 3-position of the 5-, 6- or 7-membered lactone, the following are illustrative:

Dichlorovinylidene fluoride ($CCl_2$=$CF_2$),
Chlorovinylidene fluoride ($CHCl$=$CF_2$),
Chlorotrifluoroethylene ($CClF$=$CF_2$),
Tetrafluoroethylene ($CF_2$=$CF_2$),
Tetrachloroethylene ($CCl_2$=$CCl_2$),
Vinylidene fluoride ($CH_2$=$CF_2$),
Vinylidene bromide ($CH_2$=$CBr_2$),
Vinylidene chloride ($CH_2$=$CCl_2$),
Vinylidene chlorofluoride ($CH_2$=$CClF$),
1,2-dichloro-1,2-difluoroethylene ($CClF$=$CClF$),
1,2-difluoroethylene ($CHF$=$CHF$),
1-chloro-2-fluoroethylene ($CHF$=$CHCl$),
1-dichloro-2-fluoroethylene ($CHF$=$CCl_2$),
Trichloroethylene ($CHCl$=$CCl_2$),
Trifluoroethylene ($CF_2$=$CHF$),
1-dichloro-2-difluoroethylene ($CF_2$=$CCl_2$),
Chlorotrifluoroethylene ($CF_2$=$CClF$),
1-chloro-2-difluoroethylene ($CF_2$=$CHCl$),
1-dichloro-2-difluoroethylene ($CF_2$=$CCl_2$),
Chlorotrifluoroethylene ($CF_2$=$CClF$),
Fluorotrichloroethylene ($CCl_2$=$CClF$),
Vinyl chloride ($CH_2$=$CHCl$),
Vinyl fluoride ($CH_2$=$CHF$),
Allyl chloride ($CH_2$=$CH$—$CH_2Cl$),
4-chloro-1-butene ($CH_2$=$CH$—$CH_2$—$CH_2Cl$),
3,3,4,4,4-pentafluoro-1-butene ($CH_2$=$CH$—$CF_2$—$CF_3$),
5-chloro-1-pentene ($CH_2$=$CH$—$CH_2CH_2CH_2Cl$),
3,3,4,4,5,5,5-heptafluoro-1-pentene
  ($CH_2$=$CH$—$CF_2$—$CF_2$—$CF_3$),
3,3,4,4,5,5,6,6,6-nonafluoro-1-hexene
  ($CH_2$=$CH$—$CF_2$—$CF_2$—$CF_2$—$CF_3$).

The 5-, 6- and 7-membered lactones to which the halo-α-olefin or polyhalo-α-olefin are added include the following:

γ-Butyrolactone,
5-methyl-γ-butyrolactone,
5-ethyl-γ-butyrolactone,
5-propyl-γ-butyrolactone,
5-butyl-γ-butyrolactone,
δ-Valerolactone,
6-methyl-δ-valerolactone,
6-ethyl-δ-valerolactone,
6-propyl-δ-valerolactone,
6-butyl-δ-valerolactone,
ε-Caprolactone,
7-methyl-ε-caprolactone,
7-ethyl-ε-caprolactone,
7-propyl-ε-caprolactone,
7-butyl-ε-caprolactone, While the foregoing unsubstituted and monoalkyl substituted lactones are preferred, we can also employ lactones which contain a dimethyl, diethyl, or a methylethyl group in omega positions to the carbonyl of the 5-, 6- and 7-membered lactones.

As peroxide catalysts (initiators) for the haloalkylation and polyhaloalkylation, any one of the known tertiary-alkyl organic peroxides and hydroperoxides such as, for example, Di-t-butyl peroxide,
t-Butyl perbenzoate,
Di-t-butyl perphthalate,
t-Butyl-pentamethyl-ethyl peroxide,
t-Butyl-triphenylmethyl peroxide,
Di-t-amyl peroxide,
Bis-(triethylmethyl) peroxide,
Bis-(triphenyl-methyl) peroxide,
2,5-dimethyl-hexyl-2,5-dihydroperoxide,
2,5-di-methyl-2,5-di(t-butyl peroxy) hexane,
2,5-dimethylhexyl-2,5-di(peroxy benzoate),
t-Butyl hydroperoxide,
Para-menthane hydroperoxide and the like may be used.

The following examples will show how the lactones are haloalkylated and polyhaloalkylated and the various new uses to which the resulting products may be applied.

EXAMPLE 1

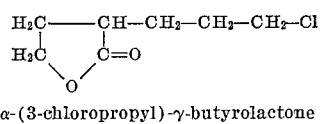

α-(3-chloropropyl)-γ-butyrolactone

Into a one-liter stainless steel shaker bomb, after a nitrogen purge, were charged the following reactants—

Butyrolactone: 688 grams (8.0 mole).
Allyl chloride: 61.2 grams (0.8 mole).
Di-t-butyl peroxide: 14.6 grams (0.1 mole).

The bomb was then sealed, heated with shaking and maintained at 130–145° C. for 16 hours. The contents, after cooling and venting the bomb, were transferred into a one-liter reaction flask and the excess reactants and the peroxide decomposition products removed in vacuum. The residue was then carefully distilled in vacuum using a 250-ml. distillation flask and a 10″ long glass helix packed column. The product, α-(3-chloropropyl)-γ-butyrolactone, was collected at 65–70° C./0.5–1.0 mm. Hg. It weighed 32.5 grams, corresponding to 25% yield based on allyl chloride. The product thus obtained was analyzed as follows:

Percent chlorine—Found: 21.95; calcd.: 21.80.
Molecular weight—Found: 159; calcd.: 162.6.

An NMR study showed the substitution was exclusively on the carbon atom alpha to the carbonyl of the lactone ring system.

EXAMPLE 2

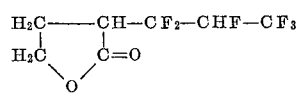

α-(1,1,2,3,3-hexafluoropropyl)-γ-butyrolactone

Into a one-liter stainless steel shaker bomb, after a nitrogen purge, was charged a solution of the following reactants—

Butylrolactone: 688 grams (8.0 moles).
2,5-dimethyl-2,5-di(t-butyl peroxy) hexane (95%): 15.0 grams (0.049 mole).

The bomb was then capped and through its gas valve 80 grams (0.532 mole) hexafluoropropylene was injected and sealed. The bomb was heated with shaking and maintained at 140–160° C. for 18 hours. After cooling and venting the bomb, the contents were discharged into a one-liter reaction flask and stripped in vacuum through an 8-inch Vigreux column to remove the excess reactants and peroxide decomposition products. The residue was then fractionated in vacuum using a 250 ml. flask, 12″ Vigreux column and a reflux ratio controller. The product which was collected at 100–105° C./5 mm. Hg weighed 88 grams, corresponding to 70% yield based on perfluoropropylene. The product was analyzed as follows:

Percent fluorine—Found: 47.75; calcd.: 48.28.
Molecular weight—Found: 241; calcd.: 236.

The NMR spectrum analysis indicated the carbon atom alpha to the carbonyl of the lactone ring to have been substituted almost exclusively.

EXAMPLE 3

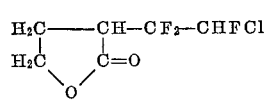

α-(1,1,2-trifluoro-2-chloroethyl)-γ-butyrolactone

Into a one-liter stainless steel shaker bomb, after a nitrogen purge, was charged a solution of the following reactants—

Butyrolactone: 602 grams (7.0 moles).
Di-t-butyl peroxide: 22 grams (0.15 mole).
Ethanol: 50 grams.

The bomb was then capped, cooled by Dry Ice, and 82 grams trifluoromonochloroethylene (0.7 mole) injected through its gas valve and sealed. The bomb was heated with shaking and maintained at 125–140° C. for 15 hours. After cooling and venting, the contents of the bomb (dark brown liquid) were discharged into a one-liter reaction flask. All volatiles and excess butyrolactone were stripped initially by atmospheric distillation and then in vacuum. The residue was subjected to a careful distillation through an 8-inch long packed column and the product collected at 130–135° C./2 mm. Hg. The product thus obtained was a pale yellow liquid, weighed 44 grams, corresponding to 31% yield based on the trifluoromonochloroethylene used. The following data were obtained on analysis.

Percent chlorine—Found: 17.8; calcd.: 17.50.
Percent fluorine—Found: 27.7; calcd.: 28.13.
Molecular weight—Found: 199; calcd.: 202.5.

EXAMPLE 4

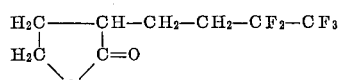

α-(3,3,4,4,4-pentafluorobutyl)-γ-butyrolactone

Into a one-liter stainless steel shaker bomb, after a nitrogen purge, a solution of the following reactants was charged—

Butyrolactone: 301 grams (3.5 moles).
Di-t-butyl peroxide: 10.0 grams (0.068 mole).
Ethanol: 50 grams.

The bomb was immediately capped, cooled by Dry Ice, and 50 grams (0.34 mole) of 3,3,4,4,4-pentafluoro-1-butene injected through its gas valve and then sealed. The bomb was then heated with shaking and maintained at 130–140° C. for 16 hours. After cooling and venting, the contents were discharged into a one-liter reaction flask and volatiles and excess butyrolactone stripped in atmospheric pressure and in vacuum. The residue, a dark yellow solution, was then subjected to fractionation through a 12-inch long packed column and the product collected at 95–105° C./1–2 mm. Hg. The product thus obtained was a colorless liquid and weighed 28 grams, corresponding to 35% yield based on the pentafluorobutene charged. The product was analyzed and the following data obtained:

Percent fluorine—Found: 40.80; calcd.: 40.92.
Molecular weight—Found: 237; calcd.: 232.15.

The NMR data obtained indicated the substitution to be on the carbon atom alpha to the carbonyl of the lactone ring.

EXAMPLE 5

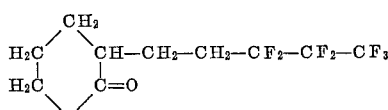

α-(3,3,4,4,5,5,5-heptafluoropentyl)-δ-valerolactone

Into a one-liter stainless steel shaker bomb, after a nitrogen purge, was charged a solution of the following reactants—

δ-Valerolactone: 600 grams (6.0 mole).
Di-t-butyl peroxide: 15.0 grams (0.1 mole).
3,3,4,4,5,5,5-heptafluoro-1-pentene: 79 grams (0.4 mole).

The bomb was then immediately sealed, heated with shaking and maintained at 130–140° C. for 16 hours.

After cooling and venting, the contents of the bomb were discharged into a reaction flask. The unreacted reactants and other volatiles were stripped in atmospheric and vacuum pressures using a 10-inch Vigreux column. The residue obtained after stripping was transferred into a 250-ml. flask and fractionated through a 10-inch packed column. The product which was collected at 110–120° C./0.5–1.0 mm. Hg, weighed 57 grams corresponding to 48% yield based on the heptafluoropentene charged. Analytical data obtained is as follows:

Percent fluorine—Found: 45.35; calcd.: 44.90.
Molecular weight—Found: 291; calcd.: 296.19.

The NMR spectrum analysis indicated the fluoroalkyl substitution to be almost exclusively on the alpha-carbon atom of the valerolactone ring.

EXAMPLE 6

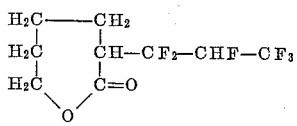

α-(1,1,2,3,3,3-hexafluoropropyl)-ε-caprolactone

Into a one-liter stainless steel shaker bomb, after a nitrogen purge, a solution of the following reactants was charged—

Caprolactone: 684 grams (6.0 mole).
Di-t-butyl peroxide: 12 grams (0.082 mole).

The bomb was immediately capped and through its gas valve was charged 60 grams (0.4 mole) hexafluoropropylene and sealed. The bomb was then heated with shaking and maintained at 125–135° C. for 16 hours. After cooling, it was vented and the contents of the bomb were discharged into a one-liter reaction flask and the excess reactants stripped in vacuum using a 6-inch Vigreux column. The residue was transferred into a 500 ml. flask and fractionated through a 12-inch heated column. The product was collected at 145–155/0.05–2 mm. Hg. It weighed 40 grams, corresponding to 37.9% yield based on the hexafluoropropylene used. On analysis, the following data were obtained:

Percent fluorine—Found: 42.70; calcd.: 43.15.
Molecular weight—Found: 256; calcd.: 264.17.

The NMR data obtained indicated the substitution to be on the carbon atom alpha to the carbonyl of the caprolactone ring.

While employing various polyhaloethylenes as reactants, such as vinylidene chloride, vinylidene chloro-fluoride, etc., the following compounds were prepared in accordance with the foregoing procedure:

(7) α-(2,2-dichloroethyl)-γ-butyrolactone.
(8) α-(2-chloro-2-fluoroethyl)-γ-butyrolactone.
(9) α-(1,1,2,2-tetrafluoroethyl)-δ-valerolactone.
(10) α-(2,2-dichloroethyl)-δ-valerolactone.
(11) α-(2,2-difluoroethyl)-ε-caprolactone.
(12) α-(2-chloro-2-fluoroethyl)-ε-caprolactone.

An NMR study showed that substitution in each of the above compounds, 7–12, was exclusively on carbon atom alpha to the carbonyl of the lactone ring.

The haloalkylated and polyhaloalkylated lactones, as above prepared, are excellent solvents for polystyrene, polyacrylonitrile, cellulose triacetate, shellac, etc. They are excellent paint and varnish film softeners and are especially useful in paint and varnish removal formulations. In view of their polyhalogen content, they exhibit an extremely low fire hazard. They are especially adaptable in petroleum processing; in specialty inks, and in the dyeing of polyacrylonitrile fibers with acetate dyes. They are excellent swelling agents for cellulose acetate films, fibers and as solvents in the welding of plastic films and in adhesive applications.

The polyhaloalkylated lactones are effective nematocides. They are excellent solvents in dye baths for dyeing synthetic fibers. They are especially suitable for melt spinning of polyacrylonitrile. Solutions of polymers of acrylonitrile in the polyhaloalkylated lactones are particularly adaptable for wet or dry spinning into fibers, and for casting into films or sheets.

The haloalkylated and polyhaloalkylated lactones react with phosgene in the presence of pyridine at about 120° C. for eight hours to give the corresponding haloalkylated or polyhaloalkylated chlorocarboxylic acid chlorides. They are excellent solvents for substituted ammonium salts as electrolytes in electrolytic capacitors. With polyalkylenepolyamines such as diethyltriamine, etc., they yield compounds useful as levelling agents.

The haloalkylated and polyhaloalkylated lactones react with ethyl metaphosphate at temperatures below 40° C. in the presence of chloroform to yield resinous materials which are useful as extenders in plasticizing agents and synthetic resins, and as fire retardants. In the polymerization of pyrrolidone in the presence of an alkaline polymerization catalyst, the polyhaloalkylated lactones increase the rate of polymerization, the yield, as well as the quality of the resulting polymer. The polyhaloalkylated lactones are useful as selective solvents for hydrocarbons, such as in the separation of liquid aromatic olefinic, naphthenic and paraffinic hydrocarbons from one another by solvent extraction and extractive distillation. In the thermal polymerization of caprolactam, they initiate the polymerization in the absence of any other reactants. They are excellent polymerization inhibitors of diacetylene compounds. Their addition to hectograph transfer solvents reduces flammability and improves the copy quality. They are useful as shrinking agents for the shrinking and setting of polyacrylonitrile textile filaments. They readily react with triethylphosphate under pressure at about 225° C. to yield compounds which are useful as plasticizers, solvents and insecticides. They are excellent for solvent extraction, especially gas oils for removal of metal contaminants. The polyhaloalkylated lactones are more selective than phenol or furfural for metal removal in solvent extraction processes, and are readily recovered by distillation. They are selective for extracting alcohols and carbonyl compounds. They are excellent inert solvent diluents in the reaction of mono- and di-saccharides with various re-agents such as acetic-anhydride and sulfonyl chloride to yield products having various uses in the pharmaceutical and other industries.

We claim:

1. A lactone selected from the class consisting of those having the following formulae:

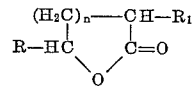

and

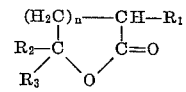

wherein $n$ is an integer of from 1 to 3, R is selected from the group consisting of hydrogen and alkyl of from 1 to 4 carbon atoms, $R_1$ is selected from the group consisting of monohaloalkyl and polyhaloalkyl of from 2 to 6 carbon atoms, $R_2$ and $R_3$ are selected from the group consisting of methyl and ethyl, the halo in said monohaloalkyl and polyhaloalkyl group is selected from the class consisting of bromine, chlorine and fluorine.

2. A lactone having the following formula:

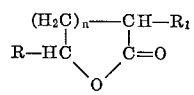

wherein $n$ is an integer of from 1 to 3, R is selected from the group consisting of hydrogen and alkyl of from 1 to 4 carbon atoms, and $R_1$ is selected from the group consisting of monohaloalkyl and polyhaloalkyl of from 2 to 6 carbon atoms, the halo in said monohaloalkyl and polyhaloalkyl group is selected from the class consisting of bromine, chorine, and fluorine.

3. A lactone having the following formula:

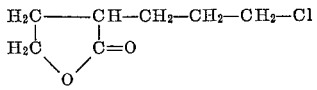

4. A lactone having the following formula:

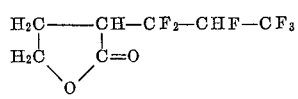

5. A lactone having the following formula:

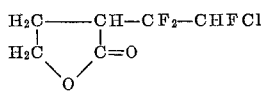

6. A lactone having the following formula:

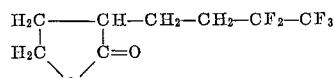

7. A lactone having the following formula:

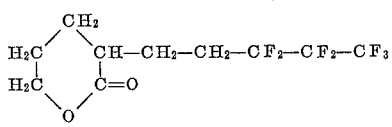

8. A lactone having the following formula:

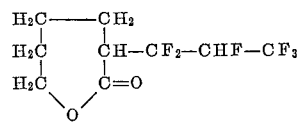

References Cited
FOREIGN PATENTS
144,478   3/1962   U.S.S.R.

WALTER A. MODANCE, *Primary Examiner.*
C. M. SHURKO, *Assistant Examiner.*